Sept. 14, 1965

C. K. GUTH 3,205,747

AIR NOTCHER

Filed Jan. 19, 1962

INVENTOR
Chester K. Guth
BY
R. D. Smith
ATTORNEY

Sept. 14, 1965  C. K. GUTH  3,205,747
AIR NOTCHER
Filed Jan. 19, 1962  2 Sheets-Sheet 2
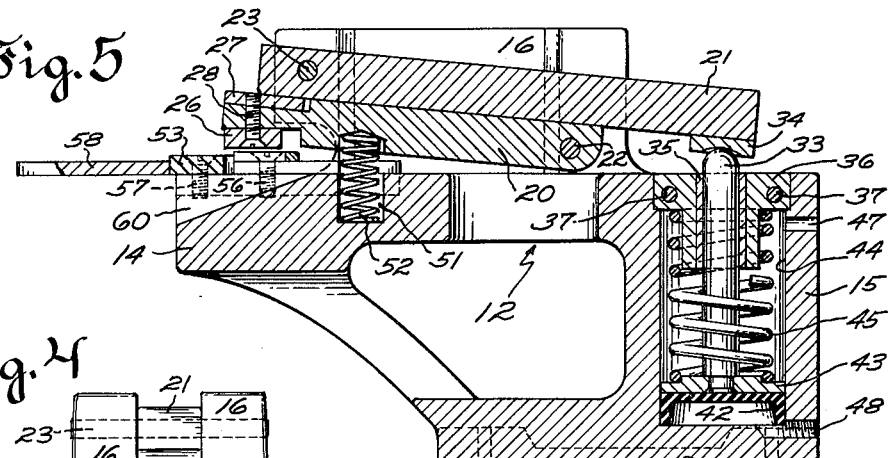
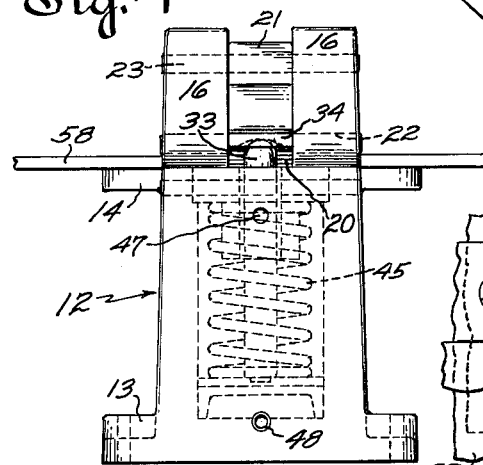
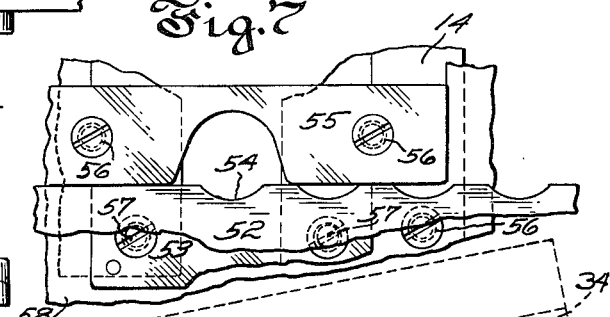
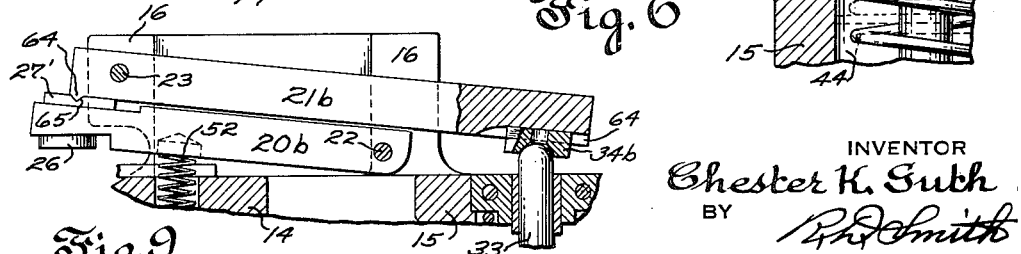
INVENTOR
Chester K. Guth
BY
R. H. Smith
ATTORNEY

United States Patent Office 3,205,747
Patented Sept. 14, 1965

3,205,747
AIR NOTCHER
Chester K. Guth, St. Petersburg, Fla., assignor to Oravisual Company, Inc., County of Pinellas, Fla., a corporation of Florida
Filed Jan. 19, 1962, Ser. No. 168,029
4 Claims. (Cl. 83—605)

This invention relates to a fluid powered metal punch of portable and very compact nature which nevertheless is capable of shearing shapes or punching out holes in sheet metal of a gauge for which heavy and more elaborate machine tools or punch presses are commonly employed.

An object of the invention is to eliminate the need for space consuming and costly machine equipment in the simpler types of punch press work such as the progressive shearing or edge notching of moderately heavy sheet metal strips.

Another object is to reduce the cost of operation and expense of maintenance of a power tool for this purpose.

Another object is to provide a tool having such shape and compact arrangement of operating mechanism that it can be mounted or carried from place to place on a work bench and does not require a floor base or frame standard with pedal controls and heavy balance wheels such as are usually associated with punch presses.

Another object is to provide a tool for the purpose stated that is so organized as to relationship of exposed stationary and movable parts that there is a minimum of likelihood of damage to the hands of the operator in the absence of safety housing structure usually employed to cover the moving parts of a larger machine tool or conventional punch press.

Another object is to achieve a maximum amount of power multiplication in the transmission of motion from a fluid motivated prime mover to a punch or die which acts on the work and by means of force transmitting mechanism that is confined to a very small space.

Another object is to give the operator ready access to a work receiving portion of the press that is safe because in thorough outboard relation to the power transmitting parts of the mechanism.

The foregoing and other objects of the invention will be more fully understood from the following description of a machine embodying the improvements and which has reference to the appended sheets of drawings wherein:

FIG. 4 is a rear view of the machine.

FIG. 5 is a view taken in section on the plane 5—5 in FIG. 2.

FIG. 6 is an enlarged fragmentary view of portions of the machine appearing in FIG. 5 shown only partially in section.

FIG. 7 is a plan view of stationary parts of the machine adjacent a notching die, the notching punch being omitted.

FIG. 9 shows another antifrictional modification.

Figure 1:
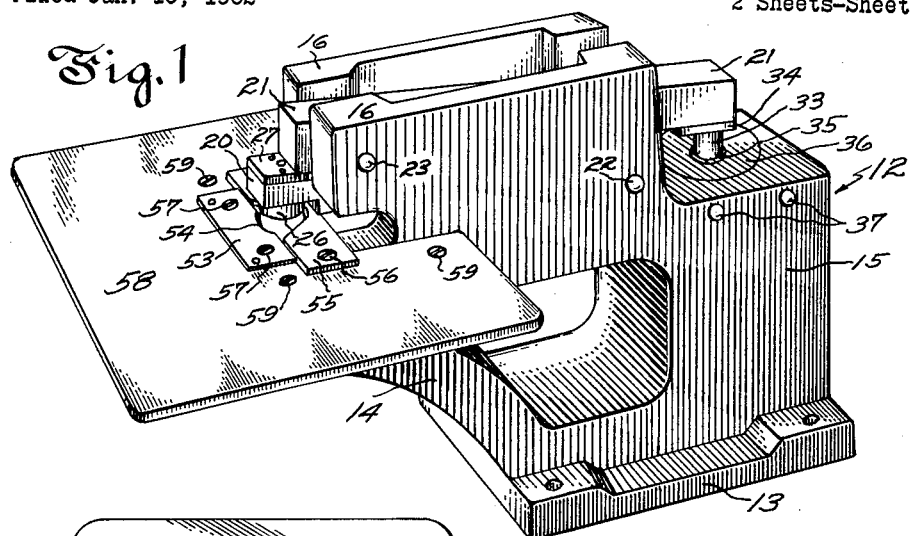
FIG. 1 is a perspective view of a fluid powered metal-working punch press embodying the improvements.
Figure 2:
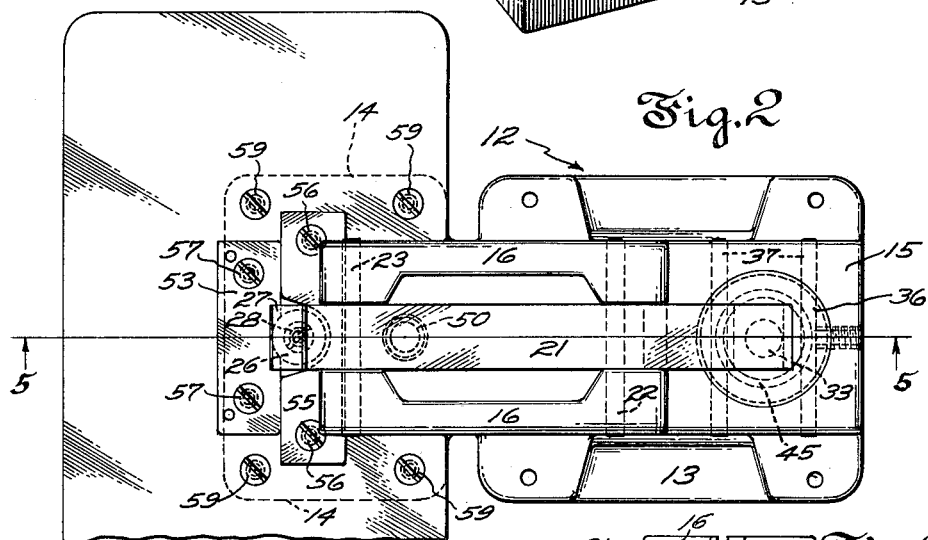
FIG. 2 is a plan view of the machine with the work rest partially cut away.

The stationary frame body of the machine may comprise an integral metal casting 12 having a base portion 13, a front end portion including an overhanging platform portion 14, a rear end portion 15, a fluid powered prime mover stationed within the confines of said rear end portion of the frame body, two laterally spaced, upstanding side walls 16 between which in vertical alignment are a punch carrying arm or rocker bar 20 and a power transmitting arm or rocker bar 21, each separately and swingably mounted by pivot pins 22 and 23, respectively, on and between the side walls 16. Casting 12 forms a completely looped frame body surrounding a void. The punch carrying arm 20 protrudes forward into outboard relation to the front edges of side walls 16, and the power arm 21 protrudes rearward beyond the rear edges of side walls 16. FIG. 1 shows that the casting 12 is hollowed inward from side-to-side in a location underlying the rocker bars 20 and 21 and intermediate the front and rear end portions of the frame body whereby to lighten the weight of the portable tool and afford a graspable shape for carrying it from place to place.

The extreme compactness of the machine coupled with the ability to produce a large force transmitting differential leverage is due in important part to the parallel arrangement of the two simple arms or rocker bars 20 and 21 which normally lie in lapped relation and in face-to-face contact throughout most of their lengths as shown in FIGS. 5 and 6 and to the placement of the fluid powered prime mover within the confines of the frame body.

Arm 20 carries on its outboard end a changeable punch or other work piercing member 26 and a wear plate 27, both of which may be secured removably to arm 20 by a screw or screws 28. The punch 26 operates to shear or cut the work and the wear plate 27 of extra hard metal provides a smooth durable pressure surface on which the slightly rounded corner 29 or arm 21 can bear and slide a little as it moves from full line position to broken line position in FIG. 6.

The power arm 21 is thus swung from its full line position to its broken line position by the upward thrust of a piston rod or stem 33 whose rounded top end engages a downward facing rounded concavity in the buffer plate 34 that is permanently secured to the under surface of arm 21 by welding or other suitable fastening means. Antifrictional constructions that may be introduced at the points of pressure application against arms 20 and 21 are disclosed in FIGS. 8 and 9.

Rod 33 moves upward and downward in the slide bearing 35 which lines a cover plug 36 that is fixedly lodged in the power cylinder portion of the body casting 12 in fluid tight assemblage therewith where it is secured by removable cross pins 37.

A piston is fixedly attached to the bottom of rod 33 and comprises the usual piston cup 42 of flexible material backed by a rigid piston disc 43 so as to ride upward and downward in the cylinder space 44 without permitting leakage of fuel pressure between the piston cup and the cylinder wall. A coil of spring wire 45 is under axial compression between the cover plug 36 and the piston disc 43 constantly urging the piston downward to its position shown in FIG. 5.

The cylinder space 44 has a fluid outlet 47 near its top end and an inlet 48 for fluid under pressure introduced through a conduit (not shown) which may have fluid tight attachment to inlet 48 by threading thereinto or by any conventional type of pipe or tubing connection.

The arm 20 is normally urged upward about its pivot pin 22 by the lifting thrust of a spring coil 50 nested in a recess 51 in frame platform 14 which spring coil returns both arms 20 and 21 to their full line position in FIGS. 5 and 6 following the punching stroke caused by each application of fluid power in the cylinder 44.

The work to be sheared, punched or notched is represented at 52 in FIG. 7 as a strip of sheet metal which may be advanced from left to right in FIG. 7 as it rests on and slides over a die plate 53 that is formed with a recess 54 that corresponds to the shearing contour of the punch 26 and is removably fastened on frame portion 14 by screws 57. The shearing action is performed when the punch descends from its full line position to its broken line position in FIG. 6. As a guide against which to locate the edge of the work piece 52 in proper position while leaving room for the punch to perform its shearing action there is provided the edge of a guide plate 55 that is higher than the die plate and secured to the outboard portion 14 of the body casting 12 so as to be adjustable or removable by means of screws 56. Partially encompassing die plate 53 there is a shelf 58 removably mounted on frame portion 14 by screws 59 to present a more spacious support surface for the work sheet or strip 52.

In operation, the supply of fluid under pressure to power chamber 44 of the prime mover through inlet 48 will normally be cut off by some remote control valve (not shown) located within convenient reach of the operator. When a work piece, such as a strip of metal 52 as shown in FIG. 7, is placed in the mouth of the press with its rear edge abutting the front edge of guide plate 55, the aforesaid pressure fluid control valve is opened to force piston rod 33 upward against the arm or bar 21 which thereupon tilts counterclockwise about its pivotal support 23 in FIG. 5 so that its front end presses downward with strong mechanical advantage on the front end of bar 20 whereupon the punch shears a notch of segmental shape out of the edge of the workpiece and the resulting sheared out fragment of the workpiece is discharged from the press downward and forward through the sloping channel 60. The arms 20 and 21 are shown for simplicity to comprise rigid rocker bars and so referred to herein but may be more complex structures where such would better serve their purpose.

While, owing to the small degree of swinging movement of the bars 20 and 21, there is but very little extent of relative shifting movement lengthwise of the bars of the point where operative pressure is imparted thereto, it is advantageous, where very forceful pressure is involved, to employ antifrictional means at such points that are movable relatively to and longitudinally to the bar being subjected to such pressure.

Figures 3, 8:
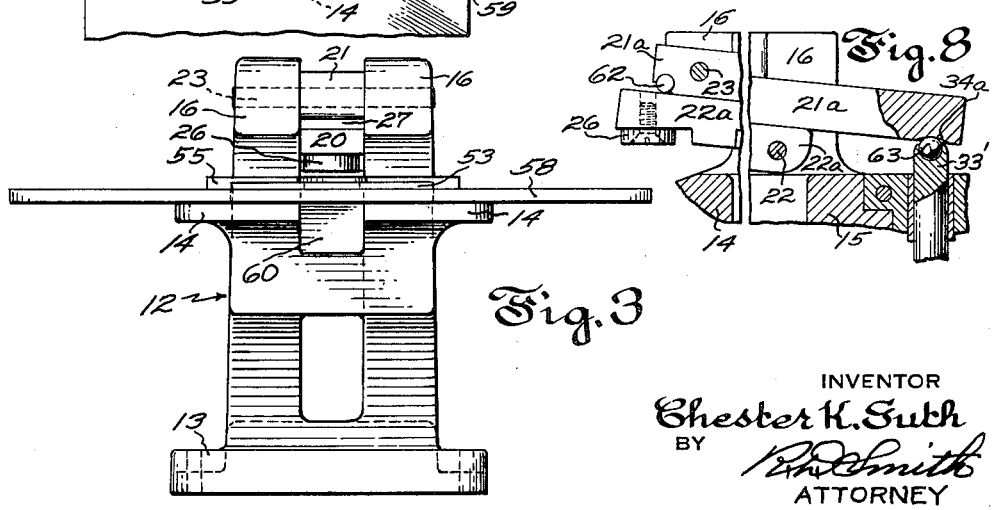
FIG. 3 shows the front of the machine as viewed from the operator's station.
FIG. 8 shows an antifrictional modification of the pressure transmitting structure at the ends of the leverage affording swingable bars.

As an example, in FIG. 8 the front corner of bar 21 can be shaped with a crosswise extending bearing groove in which is free to rotate the roller 62 which bears on the top surface of bar 22a preferably to the exclusion of direct contact between the front end portions of the bars. The concavity in bar 21a encompasses more than half the full circumference of the roller and thereby retains the roller within the concavity.

As another example, a spherical bearing socket can be formed in the top extremity of the hydraulic piston stem 33' such as will retain a ball 63 free to rotate therein. Ball 63 will press upward against a downward facing concavity 34a in the bottom surface of bar 21' like that in the buffer plate 34.

FIG. 9 shows still other antifriction means which may be used in conjunction with or in place of those shown in FIG. 8. The wear plate 27' instead of being fixed on bar 20b is free to slide lengthwise of the bar in broadside surface contact therewith and is retained sidewise between the side walls 16 of the frame. A crosswise extending ridge 64 formed on the under surface of bar 21b at the front end thereof seats in and is rockable against a crosswise extending groove 65 formed in the wear plate 27'. Also in FIG. 9 the buffer plate 34b is slidably nested in a groove 64 that runs lengthwise of bar 21b so that its concavity is kept centered on top of the piston stem 33 while plate 34b is able to slide in the groove 64. These and other modifications which come fairly under a broad interpretation of the wording of the claims are intended to be include within the coverage of the claims.

What is claimed is:

1. A fluid powered portable work processing tool comprising, a unitary frame body having a work processing front end portion and a power supplying rear end portion hollowed to form a fluid tight chamber receptive to pressurized fluid, first and second rocker bars swingably supported by said frame body each extending in lapped relation substantially from one to the other of said body end portions, a rear end of said first bar being located above said chamber and said bars being so relatively positioned and structurally interrelated that swinging movement of said first bar causes simultaneous swinging movement of said second bar, a work processing tool carried by the front end of said second rocker bar at said front end portion of said body, a piston in said fluid tight chamber motivated by changes in fluid pressure therein, and a stem having a rectilinear slide bearing fixed in said rear end portion of said unitary frame body extending from said piston outward from said fluid tight chamber into thrust transmitting engagement with said rear end portions of said first rocker bar.

2. A fluid powered portable work processing tool comprising, a unitary frame body having a work processing front end portion and a power supplying rear end portion hollowed to form a fluid tight chamber receptive to pressurized fluid, first and second rocker bars swingably supported by said frame body each extending in lapped relation substantially from one to the other of said body end portions, a rear end of said first bar being located above said fluid tight chamber and said bars being so relatively positioned and structurally interrelated that swinging movement of said first bar causes simultaneous swinging movement of said second bar, a work processing tool carried by the front end of said second rocker bar at said front end portion of said body, a piston in said fluid tight chamber motivated by changes in fluid pressure therein, a stem extending from said piston out of said fluid tight chamber into thrust transmitting relation to said rear end portion of said first rocker bar, and a slide bearing fixedly supported on said frame body constraining the said piston stem to reciprocal movement in a constant path relative thereto, the said rear end of said first rocker bar carrying a downward facing rounded concavity, and the said piston stem having a rounded top end in contact with said concavity whereby to compensate for simultaneous arcuate movement of said concavity and rectilinear movement of said stem.

3. A fluid powered portable work processing tool as defined in claim 2, in which the said concavity is contained in a buffer plate having engagement with the surface of the said end of the said first rocker bar permitting sliding of said plate relatively to said first bar in a direction lengthwise of the latter.

4. A fluid powered portable work processing tool as defined in claim 2, in which the said rounded top end of the said piston stem comprises a rollable element in power transmitting contact with the said first rocker bar.

References Cited by the Examiner
UNITED STATES PATENTS

| | | | |
|---|---|---|---|
| 230,296 | 7/80 | Lippitt | 83—605 |
| 348,731 | 9/86 | Gargrave | 83—606 |
| 371,772 | 10/87 | Litzenberger | 83—630 |
| 532,265 | 1/95 | Cornell | 83—634 X |
| 675,254 | 5/01 | Takken | 83—605 |
| 736,536 | 8/03 | McDonner | 83—589 |
| 972,189 | 10/10 | Harwood | 83—589 |
| 1,097,669 | 5/14 | Philip | 83—589 |
| 2,382,523 | 8/45 | Unger | 83—633 |
| 2,782,765 | 2/57 | Robinson | 83—639 |
| 3,004,458 | 10/61 | Dvorak | 83—601 |

ANDREW R. JUHASZ, *Primary Examiner.*
CARL W. TOMLIN, *Examiner.*